US008508710B2

(12) United States Patent
Huddleston et al.

(10) Patent No.: US 8,508,710 B2
(45) Date of Patent: Aug. 13, 2013

(54) DISPLAY PANEL

(75) Inventors: Wyatt A. Huddleston, Allen, TX (US);
Michael M. Blythe, Albany, OR (US);
Gregory W. Blythe, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2049 days.

(21) Appl. No.: 11/001,901

(22) Filed: Dec. 2, 2004

(65) Prior Publication Data

US 2006/0119798 A1    Jun. 8, 2006

(51) Int. Cl.
*G06K 9/00* (2006.01)
*G06K 9/68* (2006.01)
*G06K 9/74* (2006.01)

(52) U.S. Cl.
USPC ........... 352/106; 382/107; 382/218; 382/221; 382/291; 345/9; 345/173; 345/175; 345/180; 345/182; 353/28; 356/390; 356/391; 356/392; 356/393; 356/394; 356/395; 356/396; 356/397; 362/56.1

(58) Field of Classification Search
USPC ............ 382/106, 107, 218, 221, 291; 345/9, 345/173, 175, 182; 353/28; 356/390–397
See application file for complete search history.

(56) References Cited

U.S. PATENT DOCUMENTS

| | | | |
|---|---|---|---|
| 5,528,263 A | 6/1996 | Platzker et al. | |
| 5,936,615 A * | 8/1999 | Waters | 345/173 |
| 6,061,177 A | 5/2000 | Fujimoto | |
| 6,257,727 B1 * | 7/2001 | Melville | 353/28 |
| 6,339,748 B1 * | 1/2002 | Hiramatsu | 702/159 |
| 6,414,672 B2 * | 7/2002 | Rekimoto et al. | 345/173 |
| 6,481,851 B1 * | 11/2002 | McNelley et al. | 353/28 |
| 6,545,670 B1 * | 4/2003 | Pryor | 345/173 |
| 6,587,099 B2 | 7/2003 | Takekawa | |
| 6,774,889 B1 | 8/2004 | Zhang et al. | |
| 6,778,217 B1 | 8/2004 | Nishimura | |
| 6,920,619 B1 * | 7/2005 | Milekic | 715/859 |
| 7,050,078 B2 * | 5/2006 | Dempski | 715/700 |
| 7,084,859 B1 * | 8/2006 | Pryor | 345/173 |
| 7,210,786 B2 * | 5/2007 | Tamura et al. | 353/28 |
| 2001/0012001 A1 | 8/2001 | Rekimoto | |
| 2002/0186351 A1 | 12/2002 | Gnanamgari | |
| 2006/0036944 A1 * | 2/2006 | Wilson | 715/702 |
| 2006/0044282 A1 * | 3/2006 | Pinhanez et al. | 345/173 |

FOREIGN PATENT DOCUMENTS

| | | |
|---|---|---|
| JP | 2001116780 | 4/2001 |
| WO | WO 02/100094 A | 12/2002 |

* cited by examiner

*Primary Examiner* — Michael A Newman

(57) ABSTRACT

In accordance with one embodiment of the present disclosure, a difference is detected between a first image and a second image. The second image can include at least a portion of the first image reflected from a display panel and light from an object passing through the display panel.

61 Claims, 6 Drawing Sheets

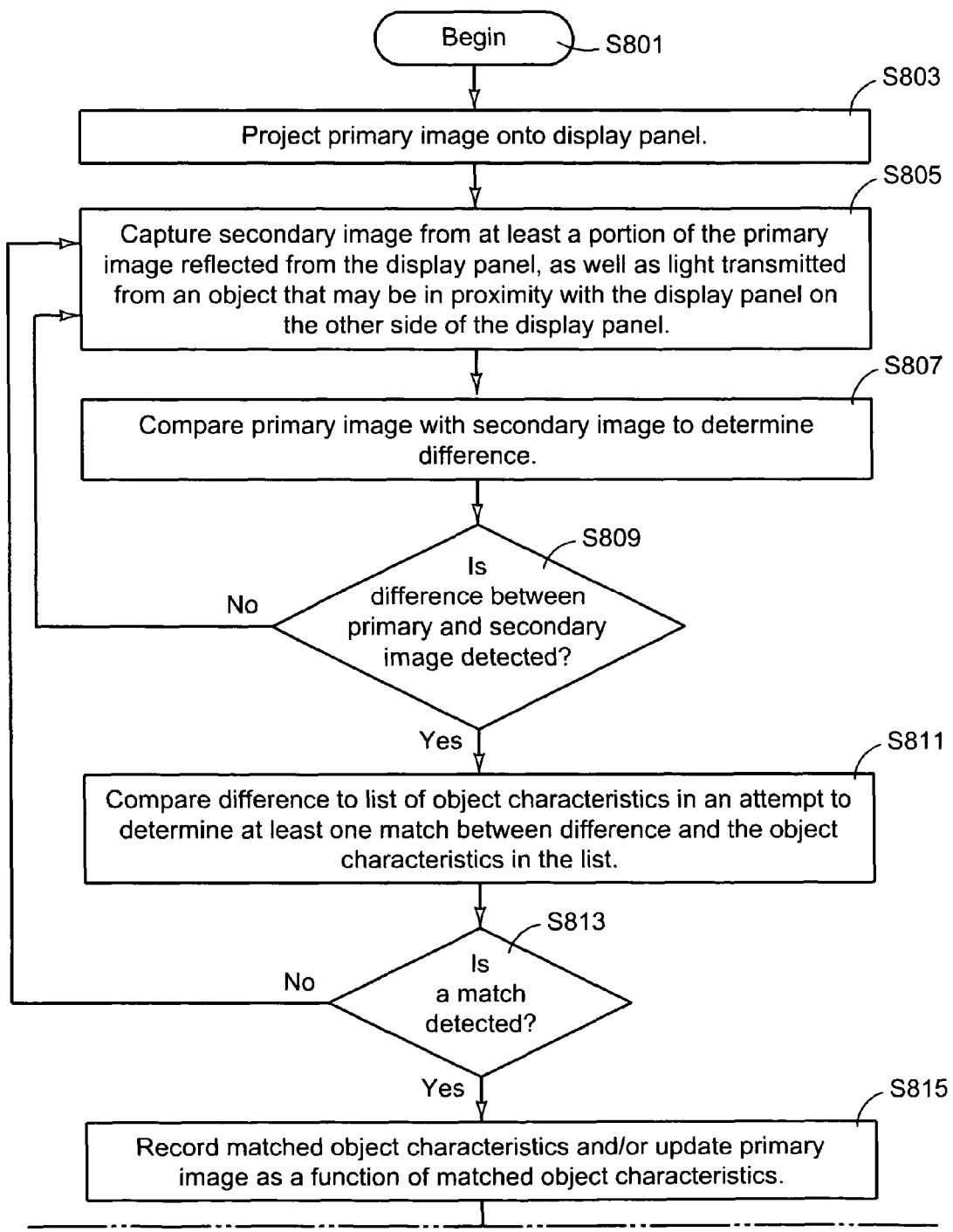

DISPLAY PANEL

BACKGROUND

Rear projection display panels may be used to display visual images for viewing by one or more individuals. Rear projection display panels may have any of a number of specific forms such as cathode ray tubes ("CRT's"), liquid crystal displays ("LCD's"), digital light projectors ("DLP's"), and the like.

A rear projection display panel can be included as a component of a display system and/or apparatus having interactive capability. Interactive capability allows a display system to receive input commands and/or input data from a user of the display system. However, in some uses of display systems having interactive capability there may be difficulties in receiving the input.

DESCRIPTION OF THE DRAWINGS

FIG. 8A depicts a first portion of an embodiment of a flow diagram in accordance with one embodiment of the present disclosure.

DETAILED DESCRIPTION

Figure 1:
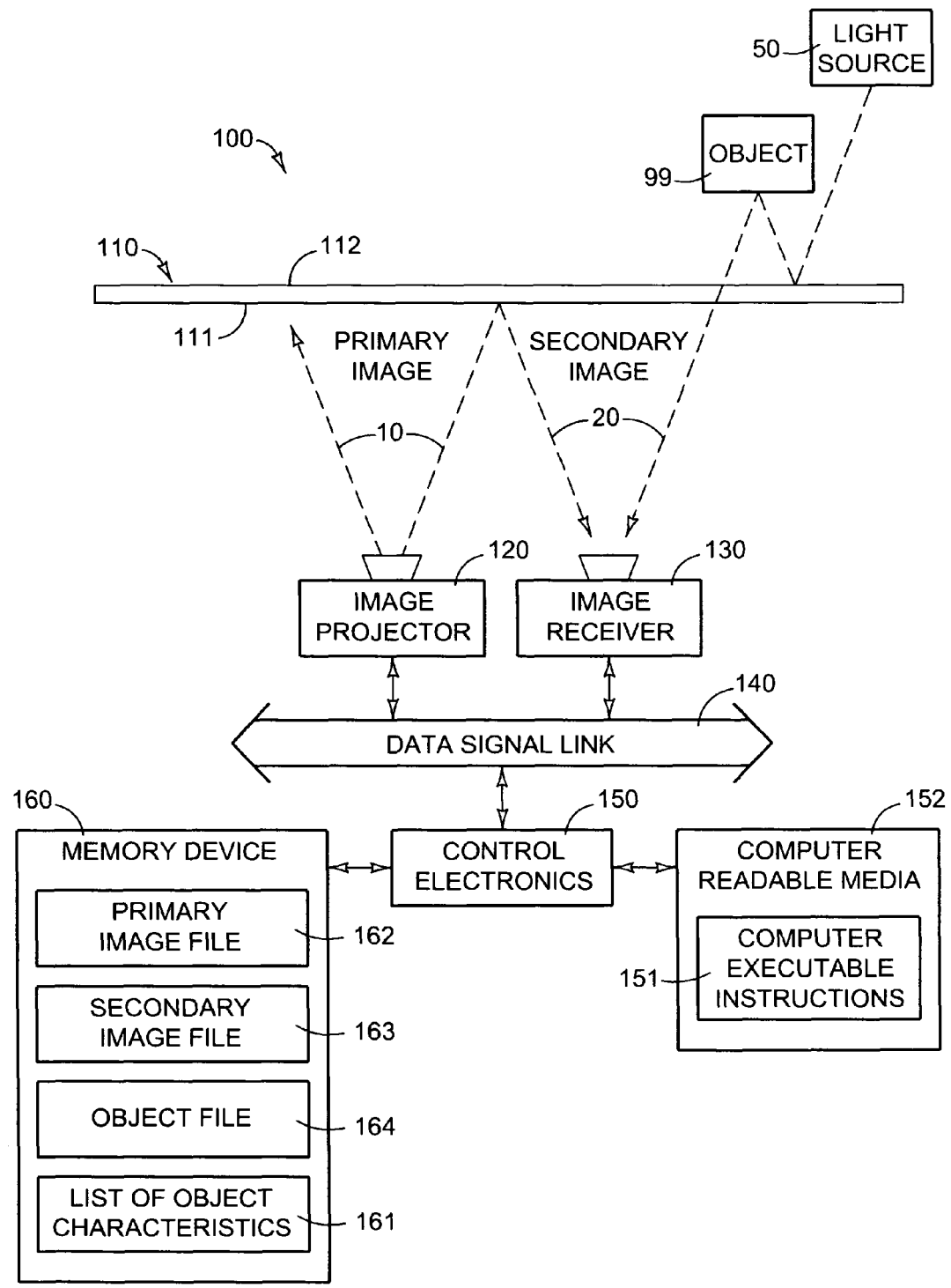
FIG. 1 depicts a schematic representation of an embodiment of a system or apparatus in accordance with one embodiment of the present disclosure.

With reference to the drawings, FIG. 1 depicts a schematic representation of an embodiment of an apparatus or system 100 in accordance with at least one embodiment of the present disclosure. The schematic representation depicted in FIG. 1 can be a cross-sectional side elevation view or a cross-sectional plan view, depending upon the specific configuration and/or orientation of the system 100.

The system 100 can be substantially in the form of a display system or the like. That is, the system 100 can be generally configured to display images that are viewable by one or more users of the system. The system 100 can include a display panel 110. Although the display panel 110 is depicted as having a substantially horizontal, orientation, it is understood that the display panel can have any orientation. For example, although not shown, the display panel 110 can have a substantially vertical, or upright, orientation.

The display panel 110 can be substantially flat as is depicted, although it may be otherwise. The display panel 110 can be substantially in the form of a plate. The display panel 110 can be substantially transparent. The display panel 110 can be fabricated from any of a number of suitable materials such as, but not limited to, glass, polycarbonate, and the like. The display panel 110 can also be fabricated from a composition of different materials. For example, the display panel 110 can be composed of a plurality of layers (not shown), wherein each layer can be fabricated from a substantially different material.

The display panel 110 can have a first side 111 and an opposite second side 112. The first side 111 and the second side 112 can be substantially parallel to one another, although they may be otherwise. The display panel 110 can be supported on a chassis or other similar support structure (not shown), which can also support one or more other components of the system 100 as a unit. However, it is understood that in accordance with at least one embodiment of the present disclosure, the system 100 can include a plurality of units, wherein each unit includes at least one component of the system.

The display panel 110 is configured to display a visual image that is viewable from the second side 112. A viewable image can be displayed on the display panel 110 by way of any of a number of suitable image-generating devices. For example, the system 100 can include one or more image projectors, or imagers 120, that are each configured to generate at least a portion of a viewable image. For example, in accordance with one embodiment of the present disclosure, a single imager 120 is included, which can be configured to produce an image, while in accordance with another embodiment of the present disclosure, a plurality of imagers can be included, wherein each imager can be configured to produce a portion of an image.

More specifically, the imager 120 can be further configured to project the viewable image onto the display panel 110. That is, the imager 120 can be configured to project at least a portion of a viewable image toward, or onto, the first side 111 of the display panel 110, so that the viewable image can be viewed from the second side 112. In such a configuration, the display panel 110 can generally be described as a "rear projection" display panel.

The imager 120 can have any of a number of suitable specific forms and/or configurations. For example, the imager 120 can be substantially in the form of a digital light projector (or "DLP"). In an exemplary embodiment, the imager 120 includes, and/or can be substantially in the form of, one or more spatial light modulators (not shown). In general, a spatial light modulator includes an array of pixel elements (not show) that can be utilized in combination with a dedicated light source (not shown) to form an array of pixels on the panel 110 to define a viewable image.

Each pixel element can be controlled to adjust an intensity and/or "on time" of each image pixel to determine a perceived intensity of the pixel. Examples of spatial light modulators include, but are not limited to, devices such as "micromirrors", "digital light projectors", and "liquid crystal displays" (or "LCD" panels). The imager 120 can include one or more color filters (not shown) configured to produce filtered light having given light frequency spectral characteristics.

The system 100 can be further configured to allow a user of the system to place at least one object 99 into proximity with the second side 112 of the display panel 110. That is, at least one object 99 can be placed into proximity with the display panel 110 on the opposite side of the display panel from the imager 120. The term "in proximity with," and/or "proximate to" as used herein can include the meaning of the term, "in contact with." That is, when the object 99 is described as being in proximity with the display panel 110, it is understood that this can include the object being in contact with, or resting on, the display panel.

Furthermore, the term, "object" as used herein is defined as anything that can be placed into proximity with the display panel 110. Thus, the object 99 can be, but is not limited to, any inanimate thing or any living thing, or any portion of a living thing such as parts of the human body, including, for example, fingertips of a user. Moreover, the object 99 can be of any shape and/or composition and/or state. Also, although one object 99 is depicted, it is understood that a plurality of objects can be in simultaneous proximity with the display panel 110.

The apparatus 100 can include an image receiver, or optical receiver 130. The optical receiver 130 can be configured to "capture" one or more images as described in greater detail below. The term "capture" as used herein is generally intended to include the meaning of "record an image" such as by way of a camera or the like. Thus, in accordance with at least one embodiment of the present disclosure, the optical receiver 130 can be substantially in the form of a camera or the like that is configured to "take a picture" while it is aimed at the first side 111 of the display panel 110.

However, it is understood that in accordance with at least one embodiment of the present disclosure, the optical receiver 130 may not be specifically in the form of a camera. Also, as is discussed in greater detail below, the optical receiver 130 can be configured to operate by detecting light that is outside of, and/or substantially outside of, the visible spectrum. That is, for example, the optical receiver 130 can be configured to detect infrared light and/or ultraviolet light.

In accordance with one embodiment of the present disclosure, the optical receiver 130 can be substantially in the form of a digital camera that generates a digital signal and/or digital data indicative of what the optical receiver 130 "sees" or "captures" when it is aimed at, or directed toward, the first side 111 of the display panel 110, as is depicted. The digital signal can be recorded on digital recording media to generate a digital image file indicative of the captured image.

The image signal captured by the optical receiver 130 can be an analog signal, wherein an analog image file can be generated. Moreover, the optical receiver 130 can capture an analog signal which can be used to generate a digital image file. When the optical receiver 130 is configured substantially in the manner of a camera, the optical receiver can be configured to capture a series of still "snapshots" and/or can be configured to capture a continuous "video stream."

The system 100 can further include control electronics, or a controller, 150. The controller 150 can be configured to carry out various control and/or data processing functions in regard to the operation of the apparatus 100. The controller 150 can be communicatively linked with the imager 120 and/or the optical receiver 130 by way of a data signal link 140 or the like. The controller 150 can contain, and/or can be communicatively linked with, a computer readable medium 152, or media. The computer readable medium 152 can contain a set of computer executable steps 151 or instructions.

It is understood that the controller 150 can be separate from the remainder of the components of the system 100. That is, the system 100 can be generally configured as a unit without the controller 150, wherein the controller can be incorporated in a separate apparatus or unit, such as a personal computer or the like (not shown), and which controller can be communicatively linked with one or more of the remainder of the components of the system 100 to provide control functions as described herein.

The computer executable instructions 151 can be configured to enable the controller 150 to carry out various functions including, but not limited to, functions which are specifically described herein. For example, the controller 150 and/or the computer executable instructions 151 can be configured to function in association with the imager 120 and/or with the optical receiver 130 to perform various functions in accordance with one or more exemplary embodiments as described herein.

The system 100 can include a memory device 160. The memory device 160 can have any of a number of suitable specific forms. The memory device 160 can store therein various data such as a list of object characteristics 161, as well as an object file 164. The memory device 160 can store one or more image files. For example, a primary image data file 162 and/or a secondary image data file 163, as well as other such files, can be stored in the memory device 160. All of the files and/or data 161, 162, 163, and 164 are described in greater detail below.

Still referring to FIG. 1, in accordance with at least one embodiment of the present disclosure, the system 100 can be configured to operate substantially in the manner described as follows. The imager 120 can project a primary image 10 at, or onto, the first side 111 of the display panel 110. The source of the primary image 10 can be a primary image file 162 that can be stored in the memory device 160. The controller 150 and/or the computer executable instructions 151 can be configured to assist the imager 120 in generating the primary image 10 from the primary image file 162.

The primary image file 162 can have any of a number of suitable specific forms in accordance with respective various embodiments of the present disclosure. For example, the primary image file 162 can be substantially in the form of a standardized digital image file format in accordance with one exemplary embodiment of the present disclosure.

In accordance with another embodiment of the present disclosure, the primary image file 162 can be substantially an analog source. In accordance with yet another embodiment of the present disclosure, the primary image file 162 can be substantially in the form of an algorithm or the like, in accordance with which the primary image 10 can be generated by the imager 120.

At least a portion of the primary image 10, after being projected by the imager 120, can pass through the display panel 110, inasmuch as the display panel can be at least partially transparent to light. Accordingly, whatever portion of the primary image 10 passes through the display panel 110 can be visible, or viewable, from the second side 112 of the display panel. That is, for example, a user (not shown) who looks at the second side 112 of the display panel 110 can see the primary image 10, inasmuch as at least a portion of the primary image 10 can pass through the display panel 110 from the first side 111 to the second side 112.

At least one object 99 can be placed by the viewer, or other user of the system 100, into substantial proximity with the display panel 110, wherein the object is on the opposite side of the display panel relative to the imager 120. That is, for example, the object 99 or objects can be placed into proximity with the second side 112 of the display panel 110 while the primary image 10 is being projected at the display panel by the imager 120, as described above.

In accordance with at least one embodiment of the present disclosure, at least a portion, or selected portions, of the object 99 can be configured so as to transmit light. At least a portion of the light that is transmitted by the object 99 can pass through the display panel 110 from the second side 112 to the first side 111. The term "transmit" or "transmitted" as used herein in connection with description of the functionality or the like of the object 99 is intended to include the meanings of "reflect" and/or "emit." That is, in accordance with various embodiments of the present disclosure, the object 99 can be configured to reflect light and/or to emit light.

Light that is "reflected" from the object 99 can originate from any source including, but not limited to, the imager 120 and/or a light source 50. The light source 50 can be included as a component of the system 100, or can be unassociated with the system. The light source 50 can have any of a number of possible specific forms. For example the specific form of the light source 50 can be, but is not limited to, an electrically powered lamp, the sun, the moon, a flame, an electric arc, or the like. Furthermore, it is understood that more than one light source 50 can affect, or be included in, the system 100 although a single light source is illustratively depicted in accordance with an exemplary embodiment of the present disclosure.

Moreover, it is understood that the exemplary location of the light source 50 relative to the system 100 is depicted for illustrative purposes and is not intended to limit form, location, and/or configuration of the light source and/or the system in any way. More specifically, for example, although the light source 50 is illustratively depicted in accordance with an exemplary embodiment of the present disclosure as being positioned to be substantially exposed to the second side 112 of the display panel 110, it is understood that in accordance with another embodiment of the present disclosure, the light source can be positioned to be substantially exposed to the first side 111 of the display panel.

Light reflected from the object 99 can originate from one or both sides of the display panel 110. More specifically, light that is reflected from the object 99 can originate from the imager 120 and/or the light source 50, wherein the light source can be located on either side of the display panel, as is explained above. Such light originating from the imager 120 and/or the light source 50 can pass through the display panel 110 and/or can be reflected from the display panel before being reflected by the object 99, depending upon the position of the light source relative to the panel.

In accordance with at least one embodiment of the present disclosure, the object 99 can include a reflective surface and/or substance and/or element that enables at least a portion of the object to be reflective to light. As is explained above, light that is reflected from the object 99 can have any of a number of possible sources. For example, the light that reflects from the object 99 can be, but is not limited to, light emitted from the imager 120 as a portion of the primary image 10 and/or light that is emitted from the light source 50, wherein such light can include natural ambient light and/or "man-made" light.

In accordance with at least one embodiment of the present disclosure, the object 99 can be configured to emit, or produce, light. Light that is emitted from, or produced by, the object 99 can have any of a number of possible sources. That is, in accordance with at least one embodiment of the present disclosure, the object 99 can include a light-generating device (not shown) having any of a number of possible configurations. Such a light-generating device can be, but is not limited to, a light emitting diode or "LED" (not shown) that is configured to emit light in conjunction with a power source (also not shown) configured to drive the LED. The object 99 can include control electronics (not shown) to control the light produced by such a light-generating device. The object 99 can also include a light-collecting and/or light intensification device configured to collect and/or intensify and/or redirect light, such as ambient light.

Additionally, the light that is reflected and/or emitted from the object 99 can have substantially any wavelength and/or frequency characteristics. That is, light reflected and/or emitted from the object 99 and which is detected and/or captured by the optical receiver 130 is not limited to any particular frequency and/or wavelength. For example, as is mentioned above, the light that is reflected and/or emitted from the object 99 can be within the visible spectrum and/or can be outside of the visible spectrum. The object 99 can be configured to send data to and/or receive data from the system 100, as is discussed in greater detail below.

With continued reference to FIG. 1, at least a portion of the primary image that is projected by the imager 120 can fail to pass completely through the display panel 110, and can be reflected by the display panel. This portion of the primary image 10, as well as the light transmitted by the object 99, and which passes through the display panel from the second side 112 to the first side 111, can be captured by the optical receiver 130.

This portion of the primary image 10 which is captured by the optical receiver 130, along with light transmitted from the object 99, which is also captured by the optical receiver 130, can make up a secondary image 20. In other words, the optical receiver 130 can be configured to capture a secondary image 20 that includes at least a portion of the primary image 10 that is reflected from the display panel 110, as well as light that is transmitted from the object 99, and which passes through the display panel.

Stated in yet another way, the optical receiver 130 can be aimed at the display panel 110, and can be configured to "take a picture" of the first side 111 of the display panel, wherein the "picture" is a secondary image 20 that substantially includes the primary image 10 reflected from the display panel 110 as well as a representative image of the object 99 that passes through the display panel and is superimposed upon the primary image. The term, "representative image" when used in connection with a description of the object 99, can include, but is not limited to, a beam of light or the like transmitted by the object.

Additionally, the optical receiver 130 can be configured and/or controlled by way of the controller 150 to capture predetermined segments of the primary image 10 relative to elapsed time, inasmuch as the primary image can change over time in accordance with at least one embodiment of the present disclosure. In other words, the image-capturing function of the optical receiver 130 can be controlled so as to be substantially "synchronized" with the image-generating function of the imager 120.

For example, if the imager 120 is substantially in the form of a digital light projector, or the like, having a rotating color wheel, the optical receiver 130 can be controlled so as to capture images "in synch" with the color wheel. Such synchronization can allow the optical receiver 130 to capture images having substantially a given color or given light frequency characteristics.

The secondary image 20 that is captured by the optical receiver 130 can be converted into a secondary image file 163, which can be stored in the memory device 160. The controller 150 and/or the computer executable instructions 151 can be configured to at least assist in converting the secondary image 20 as received by the optical receiver 130 into the secondary image file 163. The secondary image file 163 can have any of a number of possible forms in accordance with various respective embodiments of the present disclosure. For example, the secondary image file 163 can have any of the exemplary forms discussed above.

After the secondary image 20 is captured by the optical receiver 130, the system 100 can "compare" the primary image 10 with the secondary image in an attempt to detect any significant difference between the two images. Inasmuch as the secondary image 20 can contain substantially the primary image as well as a representative image of the object 99, any difference between the primary image and the secondary image will be substantially the representative image of the object.

Stated in another way, the primary image 10 can be "subtracted" from the secondary image 20 to result in a "difference." The "difference" between the primary image 10 and secondary image 20 can be substantially representative of at least a portion of the object 99. That is, when the primary image 10 is subtracted from the secondary image 20, the remaining image is that of substantially the object 99.

In this manner, the system 100 can "isolate" and/or detect an image that is representative of the object 99. Accordingly, in such a manner the system 100 can detect the object 99 when the object is placed into proximity with the display panel 110 while an image is displayed on the display panel. This process of isolating an object 99 in proximity with the display panel 110 can be referred to as "image subtraction."

The controller 150 and/or the computer executable instructions 151 can at least assist in detecting the object 99 in the manner described above by analyzing the primary image 10 and the secondary image 20 as described in greater detail below. That is, in accordance with at least one embodiment of the present disclosure, the system 100 can analyze the primary image 10 and the secondary image 20 substantially in a manner described as follows.

Figure 2:
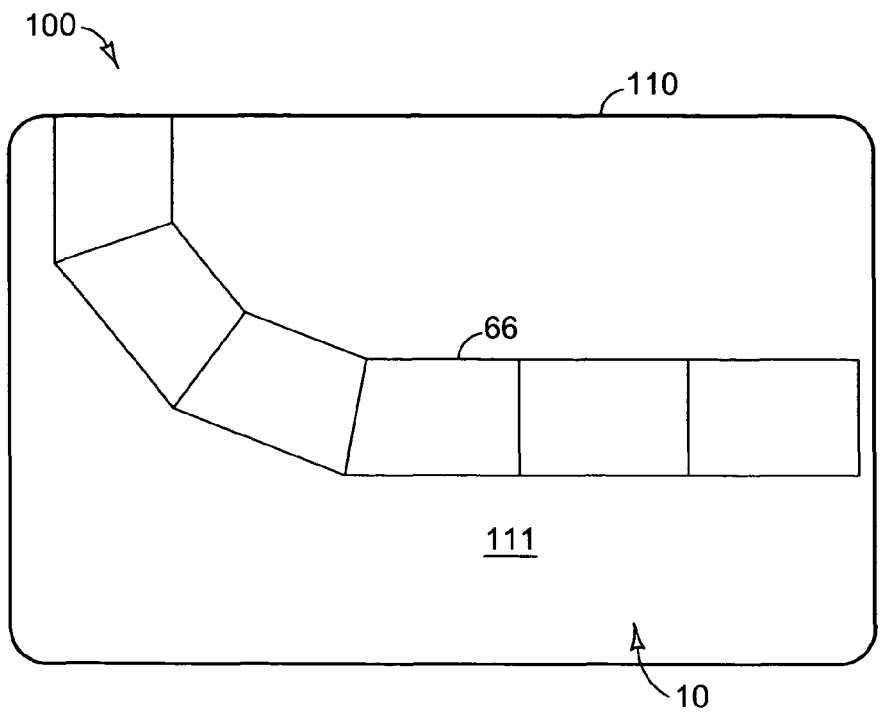
FIG. 2 depicts an exemplary image in accordance with one embodiment of the present disclosure.

Turning now to FIG. 2, an exemplary depiction of the primary image 10 is shown in accordance with one embodiment of the present disclosure. It is understood that the exemplary depiction of the primary image 10 shown in FIG. 2 is provided for illustrative purposes and is not intended to limit the nature and/or configuration of the primary image 10 and/or any component of the system 100 in any way.

Specifically, the primary image 10, as depicted in FIG. 2, can substantially have the form of a game board or the like, and is an example of a nearly limitless number of possible specific forms of the primary image. As a specific example, the primary image 10 can include a path, or road 66, which can be part of a game board or the like that can be represented by the primary image. As described above, the primary image 10 can be projected onto the display panel 110 so as to be viewable by a user of the apparatus 100. However, it is noted that the primary image 10 is depicted in FIG. 2 as viewed from the first side 111 of the display panel 110. That is, the images depicted in FIG. 2 and those that follow are what can be substantially "seen" by the optical receiver 130 (shown in FIG. 1), as is described in greater detail below.

Figure 3:
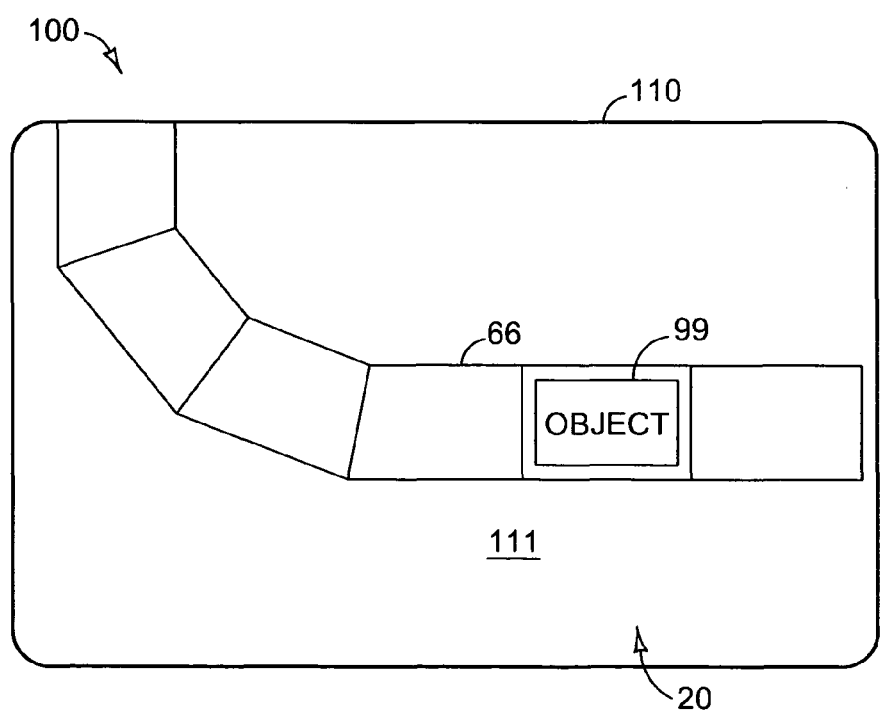
FIG. 3 depicts another exemplary image in accordance with one embodiment of the present disclosure.

With reference now to FIG. 3, an exemplary depiction of the secondary image 20 is shown in accordance with one embodiment of the present disclosure. The view depicted by FIG. 3 can be that which is "seen" or captured by the optical receiver 130. The viewer of the primary image 10, or another user of the system 100, can place the object 99 onto (or into proximity with) the display panel 110. Again, as is mentioned above, although a single object 99 is depicted for illustrative purposes, it is understood that multiple objects 99 can be simultaneously placed onto, or in proximity with, the display panel 110.

In accordance with an exemplary embodiment of the present disclosure, the object 99 can be used substantially as a game piece for playing an interactive game in which the primary image 10 as displayed on the display panel 110 can be employed as a game board. In such an instance, the object 99 can be placed onto a specific location and/or in a specific orientation relative to the display panel 110 in pursuit of playing the game. For example, the object 99 can be placed in a specific location and/or orientation relative to the path or road 66.

As is described above with reference to FIG. 1, the secondary image 20 can include at least a portion of the primary image 10 that is reflected from the display panel 110, along with light transmitted from the object 99 and which passes through the display panel. Accordingly, as is depicted in FIG. 3, the secondary image 20, as captured by the optical receiver 130, can include a representative image of the object 99 that is superimposed upon the primary image 10. Again, as is defined above, light transmitted from the object 99 can include light that originates from any source, including, but not limited to, the imager 120, a light source 50, and/or the object 99 itself.

As is briefly described above, the primary image 10 can be generated from a primary image file 162 (shown in FIG. 1), which can be stored in the memory device 160. This can be accomplished, for example, by way of the controller 150 and/or the computer executable instructions 151. The secondary image 20, once it is captured by the optical receiver 130, can be converted into a secondary image file 163, which can be stored in the memory device 160. Such conversion of the secondary image 20 can be accomplished by way of the controller 150 and/or the computer executable instructions 151.

The controller 150 and/or the computer executable instructions 151 can be configured to create an object file 164, which can be stored in the memory device 160. The object file 164 can be substantially the difference between the secondary image 20 and the primary image 10. In other words, the controller 150 and/or the computer executable instructions 151 can be configured to analyze and/or process the primary image file 162 and the secondary image file 163 in an attempt to determine a difference between the primary image 10 and the secondary image 20. Such a difference between the primary image 10, and the secondary image 20, can be stored as the object file 164.

The process of determining a difference between the primary image 10 and the secondary image 20 can be accomplished by the controller 150 and/or the computer executable instructions 151 by way of one or more methods and/or procedures in accordance with one or more respective embodiments of the present disclosure. Such procedures can include comparing two images in an attempt to detect and/or isolate a difference between the two images.

In accordance with one embodiment of the present disclosure, the controller 150 and/or the computer executable instructions 151 can divide the primary image 10 and the secondary image 20 into corresponding units or areas. That is, each such area or unit of the primary image 10 can correspond to an associated area or unit of the secondary image 20, wherein the corresponding areas or units have substantially the identical locations relative to the display panel 110, or to the perimeter of each respective image.

In accordance with another exemplary embodiment of the present disclosure, each of the primary image file 162 and the secondary image file 163 can be digital image files. In such an instance, each of the units or areas described above can be a pixel or a group of pixels in a respective digital image file. Examples of groups of pixels include arrays of pixels or lines of pixels, such as rows or pixels or columns of pixels.

The controller 150 and/or the computer executable instructions 151 can compare each corresponding pair of units or areas (i.e., one from the primary image 10 and one from the secondary image 20) to determine if a difference exists. If a difference is found, the differences can be compiled in the object file 164. Such a comparison procedure can be performed for each pair of corresponding units or areas of the primary image 10 and the secondary image 20 until substantially the entire secondary image is analyzed. After the primary image 10 and secondary image 20 are analyzed in the manner described above, the difference that is compiled in the object file 164 can be substantially a representational image of the object 99.

The rate, or frequency, at which comparisons or subtractions are performed with respect to any two images can be independent of any given operating rate associated with any given component of the apparatus or system 100. For example, in accordance with one embodiment of the present disclosure, the optical receiver 130 can be configured to operate at a rate of sixty (60) frames per second. However, for example, the controller 150 can be configured to compare, or subtract, an incoming secondary image 20 to a primary image 10 at a rate of thirty (30) times per second. Stated in yet another way, the controller 150 may not have to "look at" or compare every image captured by the image receiver 130. This can help reduce the likelihood of "bogging down" the controller 150 with high processing rates.

In accordance with at least one embodiment of the present disclosure, various aspects and/or characteristics of the primary image 10 and/or the secondary image 20 can be adjusted to facilitate the image subtraction or image comparison process described herein. For example, if the imager 120 and the optical receiver 130 are located at different respective positions relative to the display panel 110, then the primary image 10 as "seen" by the image receiver can resultantly be at least somewhat "skewed" relative to the primary image as projected by the imager due to differences in perspective.

Such differences in image perspective can be referred to as "parallactic phenomenon" or parallax. The result of such a phenomenon can be that the primary image 10, as projected by the imager 120 will not "match" the primary image, as "seen" by the optical receiver 130. To compensate for this, the apparatus 100 can include various optical devices, such as lenses or the like (not shown) to "correct" the parallax so that the imager 120 and the optical receiver 130 will have substantially the same apparent perspective relative to the primary image 10.

Additionally, the color gamut of the imager 120 and/or the optical receiver 130 can be adjusted or calibrated so that the controller 150 "sees" substantially the same color spectrum when comparing the primary image 10 with the secondary image 20. Such adjustments, calibrations and/or corrective measures can aid the controller 150 and/or computer executable instructions 151 in performing an accurate image comparison and/or "image subtraction."

Figure 4:
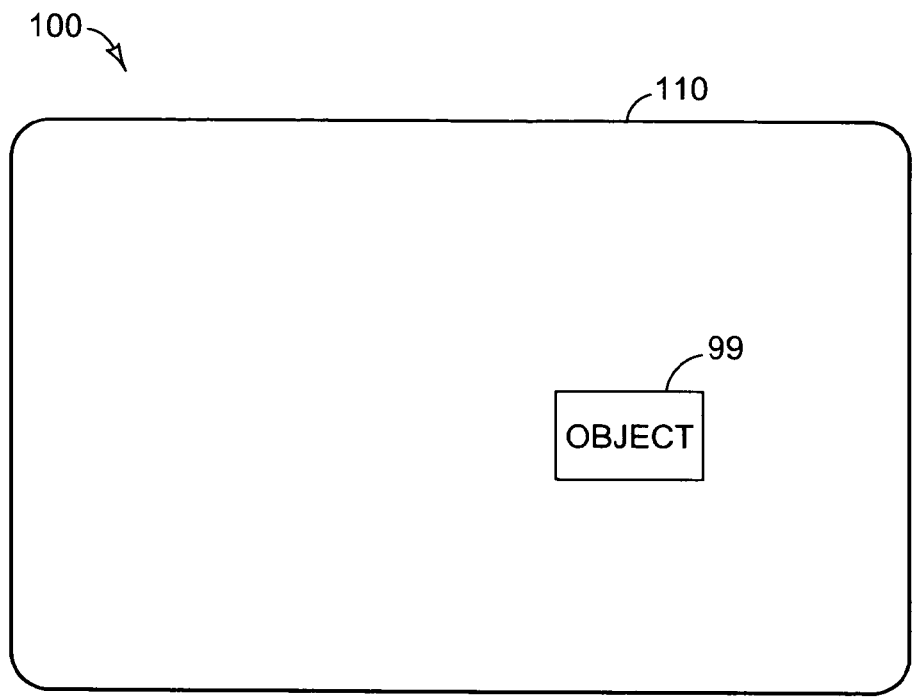
FIG. 4 depicts substantially the difference between the image depicted in FIG. 2 and the image depicted in FIG. 3 in accordance with one embodiment of the present disclosure.

Turning now to FIG. 4, the contents of the object file 164 are depicted in accordance with an exemplary embodiment of the present disclosure. That is, in accordance with one embodiment of the present disclosure, FIG. 4 depicts the contents of the object file 164 after the analysis is performed as described above. Stated in yet another way, FIG. 4 depicts the difference between the primary image 10 depicted in FIG. 2, and the secondary image 20 depicted in FIG. 3 in accordance with an exemplary embodiment of the present disclosure.

The controller 150 and/or the computer executable instructions 151 can be configured to perform further analysis subsequent to identifying, or isolating, the object 99 substantially in the manner described above. Such additional analysis can include acquiring data from the object 99 in response to, or as a result of, recognizing specific distinguishing visual characteristics of the object.

For example, data that can be acquired from the object 99 can include, but is not limited to, determining an identity of the object, and/or determining some other such trait associated with the object. Such other traits can include, but are not limited to, the orientation of the object 99 relative to the display panel 110, predefined functionality of the object when interacting with components of the system 100, location of the object relative to the display panel, instructions to carry out a predetermined task, and the like.

The object 99 can have one or more various markings (not shown) that can be detected and/or recognized by the optical receiver 130 in conjunction with the controller 150 and/or the computer executable instructions 151. For example, one such marking can be a pointer or arrow on the bottom of the object 99, wherein such a pointer or arrow can enable the system 100 to determine the orientation of the object relative to the display panel 110. Another example of such a marking can be a series of dots and/or lines arranged in a predetermined pattern, wherein the pattern has a unique associated meaning.

In accordance with one embodiment of the present disclosure, such markings can be detected and recognized by the system 100 in conjunction with the list of object characteristics 161 (shown in FIG. 1). That is, in accordance with one embodiment of the present disclosure, the controller 150 and/or the computer executable instructions 151 can be configured to compare the representative image of the object 99, as contained in the object file 163, with each of a group of predetermined object characteristics contained in the list of object characteristics 161. When one or more matches are found between the object 99 and the list of object characteristics 161, then data associated with the matched characteristics can be assigned to the object 99.

In accordance with at least one embodiment of the present disclosure, a property of the object 99 can be determined. Examples of properties of the object 99 can include, but are not limited to, velocity of the object, direction of movement of the object and/or repositioning of the object. In accordance with one embodiment of the present disclosure, one or more such properties of the object 99 can be determined by comparing a previous secondary image 20 with a subsequent secondary image.

Figure 5:
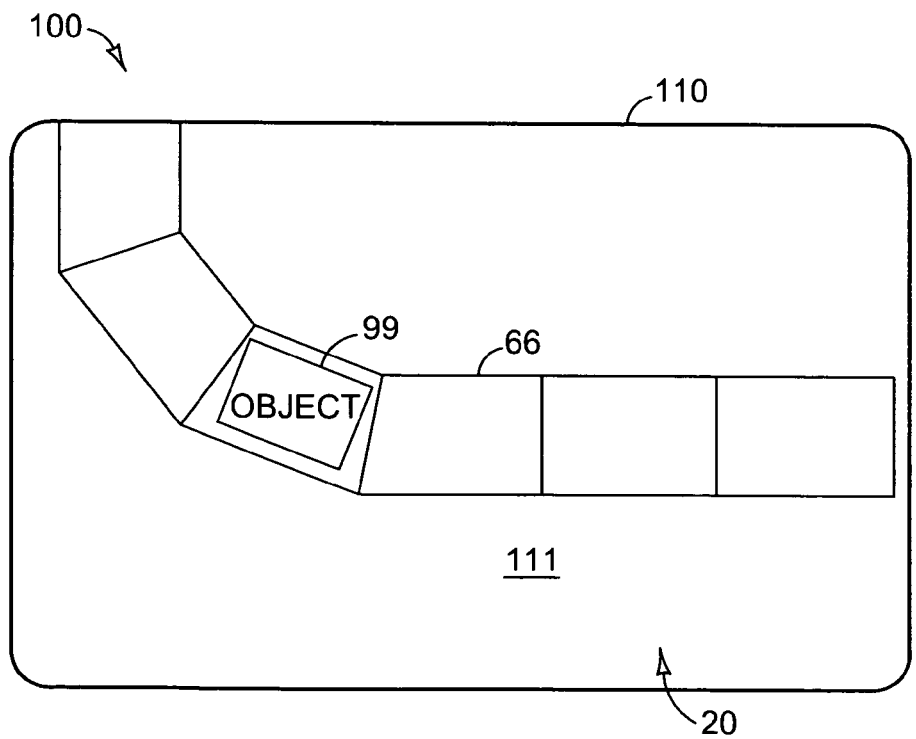
FIG. 5 depicts another image in accordance with one embodiment of the present disclosure.

Turning now to FIG. 5, a subsequent secondary image 20 is depicted in accordance with an exemplary embodiment of the present disclosure. It is seen from a study of FIG. 5 that the object 99 has been repositioned to a new location relative to the display panel 110 as compared to the location of the object in the secondary image depicted in FIG. 3. That is, FIG. 5 depicts a secondary image 20 that is captured by the optical receiver 130 subsequently to the capture of the secondary image depicted in FIG. 3, wherein the object 99 has been moved relative to the display panel 110.

In accordance with one embodiment of the present disclosure, the controller 150 and/or the computer executable instructions 151 can be configured to compare one or more previous secondary images (such as that depicted in FIG. 3) to a subsequent secondary image (such as that depicted in FIG. 5) in an attempt to determine a difference between the two images. This can be accomplished in a manner similar to that described above, wherein corresponding portions of the two images can be compared to determine any difference between the images.

Moreover, one or more previous secondary images 20 can be recorded and/or stored in the memory device 160, or the like, for later recall and comparison. The term "subsequently secondary image" as used herein is defined as any secondary image that is subsequent to a given previous secondary image. That is, when comparing a previous secondary image 20 to a subsequent secondary image, the subsequent secondary image can be either the most recently captured secondary image or an "old" secondary image.

Figure 6:
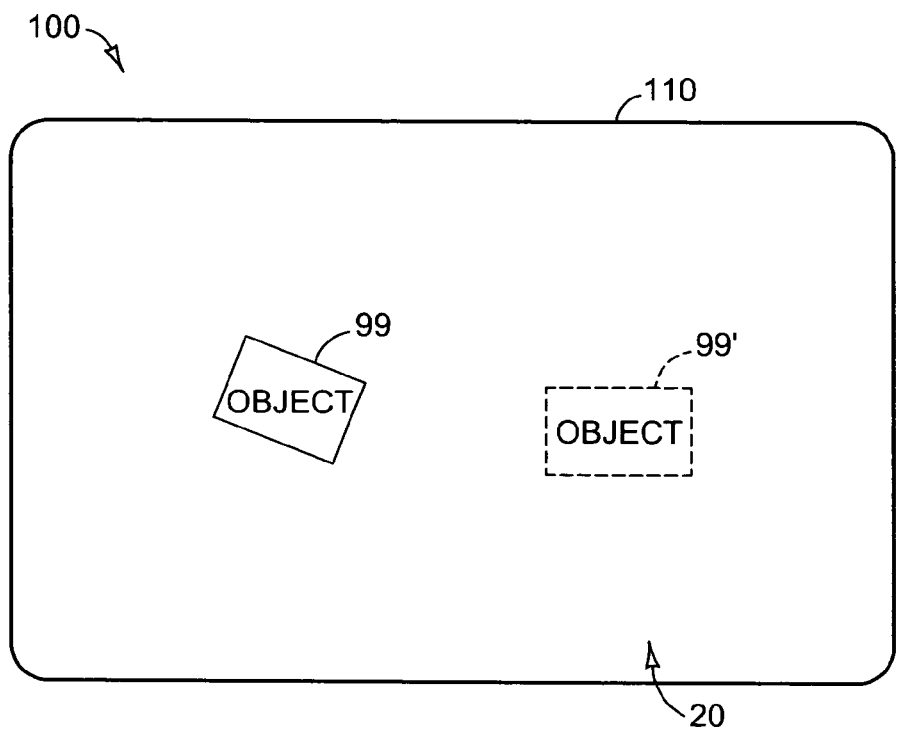
FIG. 6 depicts substantially the difference between the image depicted in FIG. 3 and the image depicted in FIG. 5 in accordance with one embodiment of the present disclosure.

With reference now to FIG. 6, an exemplary depiction shown of the difference between a previous secondary image of FIG. 3 and the subsequent secondary image of FIG. 5. More specifically, the difference between the previous secondary image 20 depicted in FIG. 3 and the subsequent secondary image depicted in FIG. 5 is the previous location of the object 99' and the subsequent location of the object 99.

In this manner, the controller 150 and/or the computer executable instructions 151 can determine changes in location of the object 99. The controller 150 and/or the computer executable instructions 151 can also be configured to determine the velocity of the object 99 relative to the display panel 110. For example, the distance between the previous location of the object 99' and the subsequent location of the object 99 can be substantially determined by comparing that distance to a predetermined distance such as a length and/or width of the display panel 110.

When this distance (i.e., the distance the object 99 has moved) is divided by the elapsed time between the previous secondary image and the subsequent secondary image, then an average velocity of the object 99 along a direction substantially parallel to the display panel 110 can be determined. Such a determination of the average velocity of the object 99 can be performed by the controller 150 and/or the computer executable instructions 151.

Figure 7:
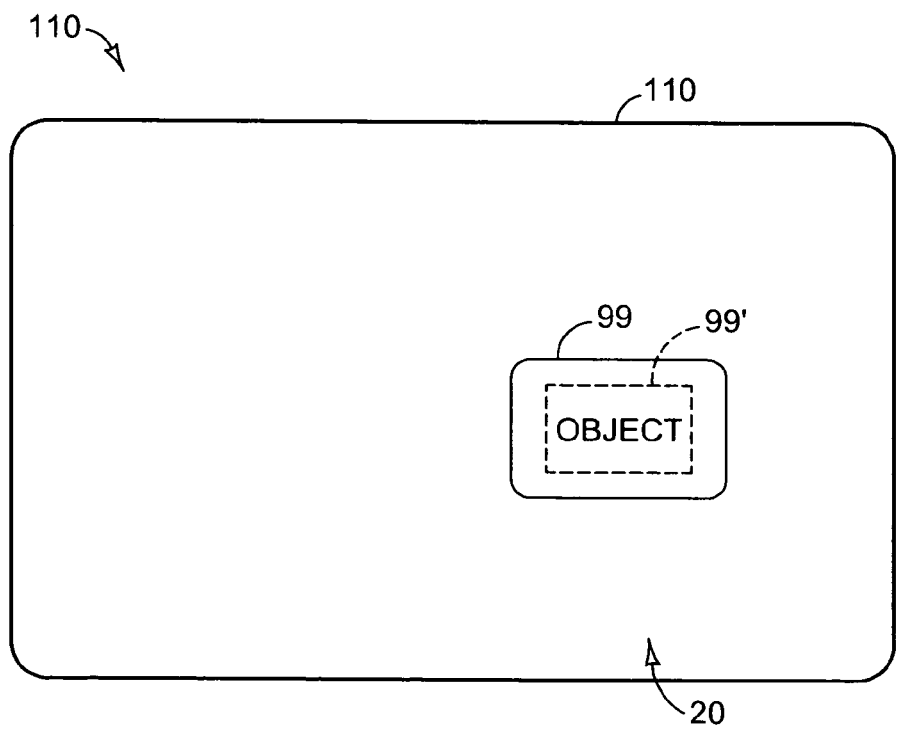
FIG. 7 depicts the difference between two images in accordance with one embodiment of the present disclosure.

A velocity of the object 99 can also be determined in a direction substantially normal to the display panel 110. With reference now to FIG. 7, another exemplary depiction is shown of the difference between a previous secondary image 20 and a subsequent secondary image. The subsequent representation of the object 99 appears to be larger than the previous representation of the object 99'. This can indicate that the object 99 has moved closer to the display panel 110, and thus appears larger. Or, this can indicate that the object 99 is fabricated from a deformable, or pliable, material, and that the object has impacted and/or is being forced against the display panel 110.

Accordingly, the controller 150 and/or the computer executable instructions 151 can be configured to determine a velocity of the object 99 in a direction substantially normal to the display panel 110. The controller 150 and/or the computer executable instructions 151 can be configured to determine the force with which the object 99 impacts, or is pushed against, the display panel 110.

In accordance with at least one embodiment of the present disclosure, the controller 150 and/or computer executable instructions 151 can be configured to initiate specific events and/or tasks in response to recognizing a given characteristic and/or property of the object 99. For example, the controller 150 and/or computer executable instructions 151 can generate updates to the primary image 10 in response to, or as a function of, any recognized characteristics and/or properties of the object 99. Such image updates can be generated simply in response to detecting the presence of the object 99 in the manner described above.

Figure 8B:
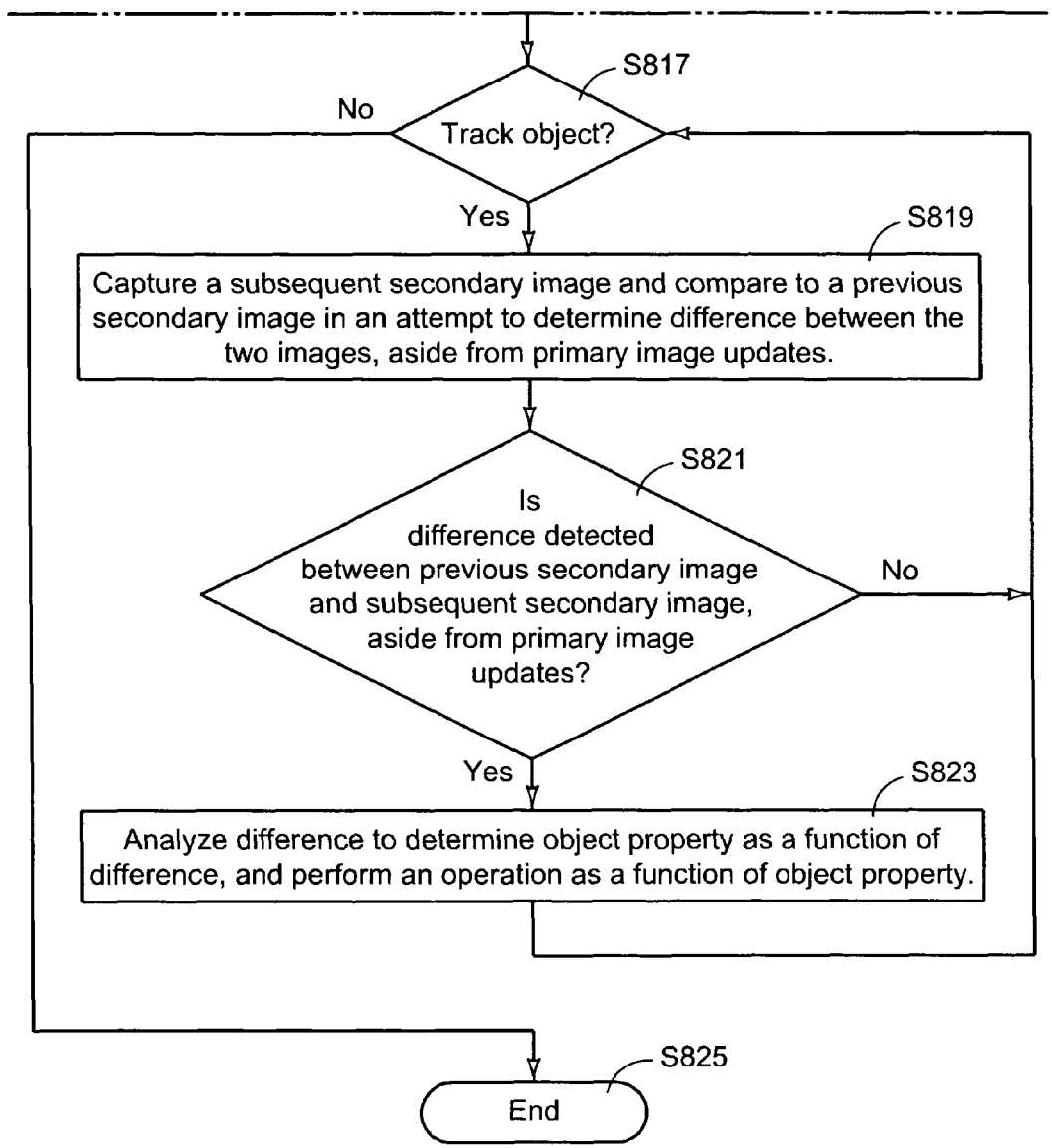
FIG. 8B depicts a second portion of the embodiment of the flow diagram, of which the first portion is depicted in FIG. 8A.

With reference now to FIGS. 8A and 8B, first and second portions, respectively, of an embodiment of a flow diagram 800 in accordance with one embodiment of the present disclosure are depicted. More specifically, FIGS. 8A and 8B together depict the flow diagram 800, which can describe an operational sequence of the system 100 (shown in FIG. 1) in accordance with one embodiment of the present disclosure. The flow diagram 800 begins at S801 and then proceeds to S803 in accordance with which a primary image is projected onto the display panel, such as is described above with reference to FIG. 1.

From S803, the diagram 800 moves to S805, which specifies that a secondary image is captured. The secondary image includes at least a portion of the primary image that is reflected from the display panel, as well as light that is transmitted from an object that can be in proximity with the display panel and on the other side of the display panel relative to the direction from which the image is projected. As is mentioned above, the light that is transmitted from the object can have one or more sources including, but not limited to, the object itself, an image projector, and/or a light source such as a lamp, the sun, or the like.

From S805 the diagram 800 moves to S807. In accordance with S807, the primary image is compared with the secondary image in an attempt to determine a difference between the primary and secondary images. From S807, the diagram proceeds to S809, which is a query. The query of S809 asks if a difference between the primary image and the secondary image has been detected as a result of S807.

If the answer to the query of S809 is "no," then the diagram 800 moves back to S805, in accordance with which another secondary image is captured. Stated another way, secondary images can be regularly captured at predetermined intervals until a difference between the primary image and the latest secondary image is detected. If a difference between the primary image and the latest secondary image is detected, then the answer to the query of S809 will be "yes."

If the answer to the query of S809 is "yes," then the diagram 800 moves to S811. The step S811 specifies that the detected difference is compared to a list of predetermined object characteristics in an attempt to determine at least one match between the difference and any of the object characteristics contained in the list.

From S811 the diagram moves to S813 which is a query. The query of S813 asks if any matches have been detected as the result of the comparison specified by S811. If the answer to the query of S813 is "no," then this can mean, in accordance with one embodiment of the present disclosure, that the object is not recognized by system 100 (shown in FIG. 1). In such an instance, the flow diagram 800 can return to S805 in accordance with which the search for an object that may be recognized by system 100 is continued.

If the answer to the query of S813 is "yes," then the diagram 800 moves to S815. The step of S815 specifies that the matched characteristics are recorded. This can include assigning matched characteristics to the object. Also in accordance with S815, the primary image can be updated as a function of the matched object characteristics. That is, the primary image can be updated, or changed, in response to recognizing one or more of the object characteristics.

After the step of S815, the diagram 800 moves to S817, which is another query. The query of S817 asks whether the object should be tracked. That is, the query of S817 asks whether the location of the object and/or other characteristics and/or properties of the object should be monitored. If the answer to the query of S817 is "no," then the diagram 800 ends at S825.

However, if the answer to the query of S817 is "yes," then the diagram moves to S819. The step of S819 specifies that another secondary image is captured and is compared to one or more previous secondary images. This can be performed in an attempt to determine a difference between two secondary images, aside from any image updates. That is, aside from any image updates that may have been done in accordance with step S815, for example, any difference between the latest secondary image and a previous secondary image can indicate a property of the object, such as is described above with respect to FIGS. 3 through 7.

A difference between the latest secondary image and a previous secondary image can indicate, for example, a change in location of the object, a velocity of the object, a change in orientation of the object, and/or data that is being transmitted from the object. For example, the object can transmit data by way of a flashing LED or the like, which can be configured to flash or pulse according to a predetermined code.

From S819, the diagram 800 moves to S821, which is yet another query. The query of S821 asks whether a difference has been detected between a given secondary image and a previous secondary image, aside from any image updates. If the answer to the query of S821 is "no," then the diagram 800 moves back to S817.

However, if the answer to the query of S821 is "yes," then the diagram 800 proceeds to S823. The step of S823 specifies that the difference determined as a result of S821 is analyzed to determine the object property as a function of the difference. Also, in accordance with S823, an operation can be performed as a function of the object property as determined in accordance with step S823.

The term "operation" as used herein is defined as any operation performed by the system 100. For example, in accordance with an exemplary embodiment of the present disclosure, an operation includes updating the primary image as a function of the object property determined in accordance with S823. From S823, the diagram goes back to the query of S817, which asks whether to continue tracking the object.

In accordance with at least one embodiment of the present disclosure, a method is contemplated. The method, as well as other methods in accordance with other respective embodiments of the present disclosure, can be substantially performed in conjunction with the system 100, or portions and/or components of the system, as described above with respect to the accompanying figures. The method can be, for example, a method of detecting an object, although it may be otherwise.

The method includes capturing a second image that includes at least a portion of a first image reflected from a display panel, and light transmitted from an object. The light transmitted from the object can pass through the display panel before being captured in the second image. A difference between the first image and the second image can be detected. The method can also include projecting the first image onto a first side of a display panel. The first side can be substantially opposite of, and can be substantially parallel to, a second side of the display panel. The object can be substantially in proximity with the second side of the display panel.

The first image can be, for example, any primary image, and the second image can be, for example, any secondary image. The second image can include at least a portion of the first image that is reflected from the display panel, in addition to light from the object. Light from the object can be transmitted (e.g. reflected and/or emitted) from the object in proximity with a second side of the display panel. As is mentioned above, light that is transmitted from the object have one or more sources including, but not limited to, the object itself, an image projector, and/or a light source such as a lamp, the sun, or the like.

The difference that is detected between the first image and the second image can be a representative image of at least a portion of the object. The first image can be produced from a first image file, such as a digital image file. The method can further include generating a second image file from the second image. The second image file can be a digital image file.

The method can include detecting a difference between the first image file and the second image file. If the first image file and the second image file are each digital image files, then detecting a difference between the first and second image files can include detecting a difference between a first digital image file and a second digital image file.

Detecting a difference between the first image file and the second image file can include detecting a difference between a portion of the first image file and a corresponding portion of the second image file. In accordance with the method, a first digital image file can include a plurality of first pixels and a second digital image file can include a plurality of second pixels. In such an instance, detecting a difference between the first image file and the second image file can include detecting a difference between a first pixel and a corresponding second pixel.

The method can include detecting a difference between a group of first pixels and a corresponding group of second pixels. The group of first pixels can be an array of first pixels. Similarly, the group of second pixels can be an array of second pixels. The group of first pixels can be a line of pixels, such as a row of pixels or a column of pixels. Likewise, the group of second pixels can be a line of pixels, such as a row of pixels or a column of pixels.

The method can include capturing a third image. The third image can be, for example, a subsequent secondary image. That is, the third image can include at least a portion of the first image reflected from the display panel, as well as light that is transmitted from the object, wherein the third image is captured after the second image is captured. The method can include comparing the third image with the second image to determine a difference between the two images. Such a difference between the second image and the third image can indicate a property of the object, such as a change in location, a velocity, a change in orientation, or the like.

A third image file can be generated from the third image. The third image file can be a digital image file. The method can include detecting a difference between the second image file and the third image file. Likewise, the method can include detecting a difference between the second digital image file and the third digital image file.

It is understood that the terms, "first," "second," "third," and the like, as used herein are, unless otherwise specified, intended to convey relative order. That is, a first image is previous to a second image, which is previous to a third image. Furthermore, the first image may not be literally the first image acquired, the second image may not be literally the second image acquired. Rather, the first image can be, for example, the tenth image acquired, while the second image can be the twentieth image acquired.

In accordance with at least one embodiment of the present disclosure, a method can include generating a first file that contains a representation of at least a portion of the object. This file can be a digital image file. The method can also include comparing the object representation in the first file to a second file that contains a list of predetermined object characteristics.

The method can include identifying a match between the object representation and the list of predetermined object characteristics. The method can include projecting a first image, such as a primary image, onto a display panel. The method can further include performing an operation in response to identifying a match between the object representation and the list of predetermined object characteristics. Performing an operation can include, but is not limited to, updating the primary image and/or updating a secondary image.

In accordance with at least one embodiment of the present disclosure, a method includes receiving data from the object and/or sending data to the object. Sending data to the object and/or receiving data from the object can be performed in response to an event which can include, but is not limited to, detecting the presence of the object, recognizing a characteristic of the object, and/or determining a property of the object.

Data can be received from the object and/or sent to the object by way of optical transmission. Such optical transmission can include encoded light that is passed through the display panel. The source for such encoded light can be the imager, wherein data is sent to the object from the system.

The preceding description has been presented to illustrate and describe methods and apparatus in accordance with respective embodiments of the present disclosure. It is not intended to be exhaustive or to limit the disclosure to any precise form disclosed. Many modifications and variations are possible in light of the above teaching. It is intended that the scope of the invention be defined by the following claims.

What is claimed is:

1. A method, comprising:
generating a first image on a first side of a display panel using visible light, a reflected portion of the first image being reflected from the first side of the display panel, a displayed portion of the first image being passed through the display panel and user-viewable on a second side of the display panel;
receiving light from an object located on a second side of the display panel;
capturing a second image comprising at least a portion of the reflected portion of the first image and at least a portion of the received light; and
detecting a difference between the first image and the second image.

2. The method of claim 1, wherein:
the object is in proximity with the second side of the display panel.

3. The method of claim 1, wherein the received light is emitted from the object.

4. The method of claim 1, wherein the difference between the first image and the second image is a representation of at least a portion of the object.

5. The method of claim 1, wherein the first image is produced from a first image file, the method further comprising generating a second image file from the second image.

6. The method of claim 5, wherein detecting the difference between the first image and the second image comprises detecting a difference between the first image file and the second image file.

7. The method of claim 6, wherein detecting the difference between the first image file and the second image file comprises comparing a portion of the first image file to a corresponding portion of the second image file.

8. The method of claim 6, wherein:
the first image file comprises a plurality of first pixels;
the second image file comprises a plurality of second pixels; and
detecting the difference between the first image file and the second image file comprises detecting a difference between a first pixel and a corresponding second pixel.

9. The method of claim 6, wherein:
the first image file comprises a plurality of first pixels;
the second image file comprises a plurality of second pixels; and
detecting the difference between the first image file and the second image file comprises detecting a difference between a group of the first pixels and a corresponding group of the second pixels.

10. The method of claim 9, wherein:
the group of first pixels is a line of first pixels; and
the group of second pixels is a line of second pixels.

11. The method of claim 9, wherein:
the group of first pixels is an array of first pixels; and
the group of second pixels is an array of second pixels.

12. The method of claim 6, further comprising:
capturing a third image that comprises at least a second portion of the reflected portion of the first image and at least a second portion of the received light from the object, wherein the third image is subsequent to the second image;
generating a third image file from the third image; and
detecting a second difference between the second image file and the third image file, wherein the second difference is a representation of at least a portion of the object.

13. The method of claim 12, wherein the second difference is a representation of a change in position of the object relative to the display panel.

14. A method, comprising:
projecting, using visible light, a first image onto a first side of a display panel, a reflected portion of the first image being reflected from the first side of the display panel, a displayed portion of the first image being passed through the display panel and user-viewable on a second side of the display panel;
at a first point in time, capturing a second image that comprises at least a portion of the reflected portion of the first image and light transmitted from an object in proximity with a second side of the display panel;
at a second point in time, capturing a third image that comprises at least a portion of the reflected portion of the first image as well as light transmitted from the object, wherein the third image is subsequent to the second image; and,
detecting a difference between the second image and the third image, wherein the difference is a representation of at least a portion of the object.

15. The method of claim 14, further comprising:
generating a first image file from the second image; and
generating a second image file from the third image, wherein detecting the difference between the second image and the third image comprises detecting a difference between the first image file and the second image file.

16. The method of claim 15, wherein:
the first image file comprises a plurality of first pixels;
the second image file comprises a plurality of second pixels; and
detecting the difference between the first image file and the second image file comprises detecting a difference between a group of one or more of the first pixels and a corresponding group of one or more of the second pixels.

17. A method of detecting the presence of an object, the method comprising:
generating, from a first image file, a first image on a first side of a display panel using visible light, a reflected portion of the first image being reflected from the first side of the display panel, a displayed portion of the first image passing through the display panel and viewable by a user on a second side of the display panel;

receiving light from an object located on a second side of the display panel;

capturing a second image comprising at least a portion of the reflected portion of the first image and at least a portion of the received light;

generating a second image file from the second image; and detecting a difference between the first image and the second image by comparing the first image file and the second image file.

18. The method of claim 17, wherein the object is in proximity with the second side of the display panel.

19. The method of claim 17, wherein the received light is emitted from the object.

20. The method of claim 17, wherein the difference between the first image and the second image is a representation of at least a portion of the object.

21. The method of claim 20, further comprising analyzing the difference, representing at least a portion of the object, to determine at least one characteristic of the object.

22. The method of claim 20, further comprising:
generating a first file containing the representation of the at least a portion of the object using the difference; and,
comparing the representation to a second file containing a list of object characteristics.

23. The method of claim 22, further comprising identifying a match between the representation and at least one object characteristic contained in the list.

24. The method of claim 23, further comprising performing an operation in response to identifying the match.

25. The method of claim 21, wherein the at least one characteristic of the object is a position of the object relative to the display panel.

26. The method of claim 25, wherein the position of the object is an orientation of the object relative to the display panel.

27. The method of claim 25, wherein the position of the object is a location of the object relative to the display panel.

28. The method of claim 21, wherein the at least one characteristic is a velocity of the object relative to the display panel.

29. The method of claim 21, wherein the at least one characteristic is a type of object.

30. The method of claim 21, wherein the at least one characteristic is a visual feature of the object.

31. The method of claim 21, further comprising transmitting data to the object in response to determining at least one characteristic of the object.

32. The method of claim 31, wherein transmitting data comprises optically transmitting data through the display panel.

33. A non-transitory machine-readable medium, the machine-readable medium having stored thereon computer executable instructions to:
project a first image on a first side of a display panel using visible light, a reflected portion of the first image being reflected from the first side of the display panel, a displayed portion of the first image being passed through the display panel and user-viewable on a second side of the display panel;
generate a second image by capturing at least a portion of the reflected portion of the first image and at least a portion of light received from an object located on the second side of the display panel; and
detect a difference between the first image and the second image.

34. The non-transitory machine-readable medium of claim 33, wherein the object is proximate with the second side of the display panel.

35. The non-transitory machine-readable medium of claim 33, wherein the received light is emitted from the object.

36. The non-transitory machine-readable medium of claim 33 storing further instructions to define the difference as a representation of at least a portion of the object.

37. The non-transitory machine-readable medium of claim 36 storing further instructions to:
compare the representation to a list of object characteristics; and,
identify at least one characteristic of the object in response to comparing the representation to the list.

38. The non-transitory machine-readable medium of claim 37 storing further instructions to update the first image in response to identifying at least one characteristic.

39. A system, comprising:
an imager to project a first image on a first side of a display panel using visible light, a reflected portion of the first image being reflected from the first side of the display panel, a displayed portion of the first image being passed through the display panel and user-viewable on a second side of the display panel;
an optical receiver configured to capture a second image that comprises at least a portion of the reflected portion of the first image and light received from an object located on the second side of the display panel; and
a controller configured to determine a difference between the first image and the second image.

40. The system of claim 39, further comprising a controller with which the imager is communicatively linked.

41. The system of claim 39, further comprising the display panel onto which the imager is to project the first image.

42. The system of claim 39, further comprising a controller with which the optical receiver is communicatively linked.

43. The system of claim 42, further comprising a computer readable medium containing a series of computer executable instructions which are accessible by the controller and which are configured to detect the difference between the first image and the second image.

44. The system of claim 43, wherein the computer executable instructions are further configured to recognize the difference as a representation of at least a portion of the object.

45. The system of claim 44, wherein the computer executable instructions are further configured to:
compare the representation to a list of object characteristics; and,
identify at least one characteristic of the object in response to comparing the representation to the list.

46. The system of claim 45, wherein the computer executable instructions are further configured to perform an operation in response to identifying at least one characteristic of the object.

47. The system of claim 43, wherein the computer executable instructions are further configured to detect a difference between the second image and a third image that comprises at least a portion of the reflected portion of the first image as well as light received from the object, wherein the third image is subsequent to the second image.

48. The system of claim 47, wherein the computer executable instructions are further configured to recognize the difference between the second image and the third image as a property of the object.

49. The system of claim 48, wherein the property of the object is selected from the group consisting of:

a change in position of the object relative to the display panel; and, a velocity of the object relative to the display panel.

50. The system of claim 45, wherein the computer executable instructions are further configured to cause data to be sent to the object in response to identifying at least one characteristic of the object.

51. The system of claim 50, wherein causing data to be sent to the object comprises causing the imager to optically transmit data to the object through the display panel.

52. An apparatus, comprising:
a means for projecting a first image onto a first side of a display panel using visible light, a reflected portion of the first image being reflected from the first side of the display panel, a displayed portion of the first image being passed through the display panel and user-viewable on a second side of the display panel;
a means for capturing a second image that comprises at least a portion of the reflected portion of the first image as well as light received from an object in proximity with a second side of the display panel; and
a means for detecting a difference between the first image and the second image, wherein the difference is a representation of at least a portion of the object.

53. The apparatus of claim 52, wherein the first image is produced from a first image file, the apparatus further comprising a means for producing a second image file from the second image.

54. The apparatus of claim 53, wherein the means for detecting a difference comprises a means for detecting a difference between the first image file and the second image file.

55. The method of claim 1, wherein the received light is reflected by the object.

56. The method of claim 1, wherein the received light originates from an external light source on the second side of the display panel.

57. The method of claim 1, wherein the first image comprises a plurality of pixels, wherein each pixel of the plurality of pixels is individually controllable to adjust an intensity of the pixel.

58. The method of claim 14, wherein the light transmitted from the object originates from the second side of the display panel.

59. The non-transitory machine-readable medium of claim 33, wherein the received light originates from an external light source on the second side of the display panel, and wherein the received light is reflected by the object.

60. The system of claim 39, wherein the received light originates from an external light source on the second side of the display panel, and wherein the received light is reflected by the object.

61. The apparatus of claim 52, wherein the received light originates from an external light source on the second side of the display panel, and wherein the received light is reflected by the object.

* * * * *